Figure 6:
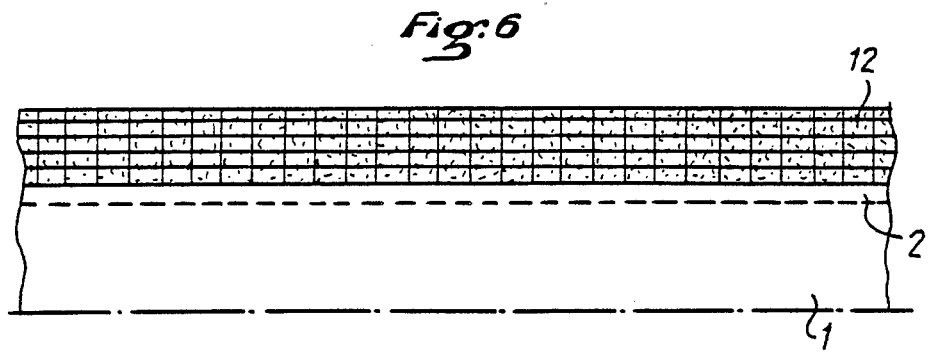

United States Patent [19]

Dridi et al.

[11] Patent Number: 4,921,018
[45] Date of Patent: May 1, 1990

[54] HEAT INSULATED LINE FOR THE TRANSPORT OF FLUIDS

[75] Inventors: Hamadi Dridi, Paris; Bernard Dewimille, Grigny, both of France

[73] Assignee: Coflexip, Paris, France

[21] Appl. No.: 829,145

[22] PCT Filed: Apr. 25, 1985

[86] PCT No.: PCT/FR85/00097
§ 371 Date: Dec. 26, 1985
§ 102(e) Date: Dec. 26, 1985

[87] PCT Pub. No.: WO85/04941
PCT Pub. Date: Nov. 7, 1985

[30] Foreign Application Priority Data
Apr. 25, 1984 [FR] France .................. 84 06483

[51] Int. Cl.$^5$ ............................... F16L 9/14
[52] U.S. Cl. ................... 138/149; 138/148; 285/47

[58] Field of Search ............... 138/140, 141, 149, 148, 138/122; 285/47, 55, 133 R

[56] References Cited

U.S. PATENT DOCUMENTS

| | | | |
|---|---|---|---|
| 2,857,931 | 10/1958 | Lawton | 138/149 X |
| 3,830,899 | 8/1974 | Piccioli et al. | 138/149 X |
| 4,025,091 | 5/1977 | Zeile | 138/149 X |
| 4,241,762 | 12/1980 | Link et al. | 138/149 X |
| 4,417,603 | 11/1983 | Argy | 138/122 X |
| 4,509,561 | 4/1985 | Litz | 138/149 |
| 4,590,971 | 5/1986 | Webster et al. | 138/149 |

*Primary Examiner*—James E. Bryant, III
*Attorney, Agent, or Firm*—Charles Fallow; Martin Hoffman

[57] ABSTRACT

A flexible, thermally insulated conduit has a central pipe and a coaxial casing spaced therefrom by annular spacers, defining a series of seated chambers. The chambers are filled with a foam material.

4 Claims, 2 Drawing Sheets

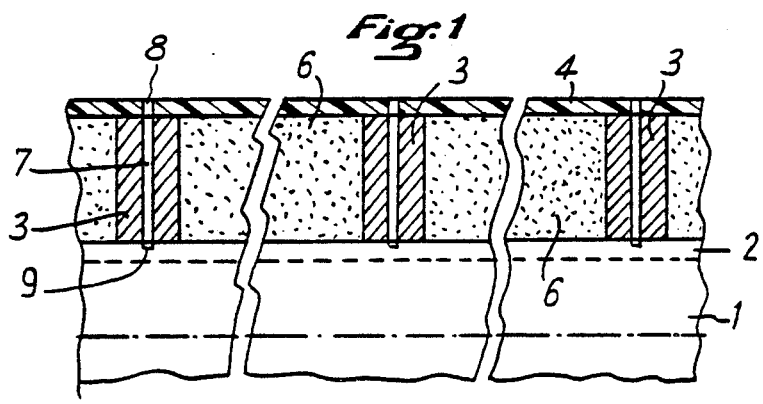
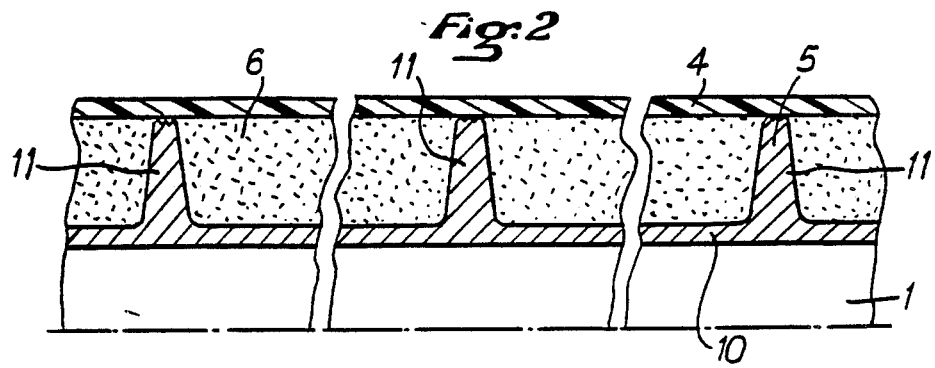
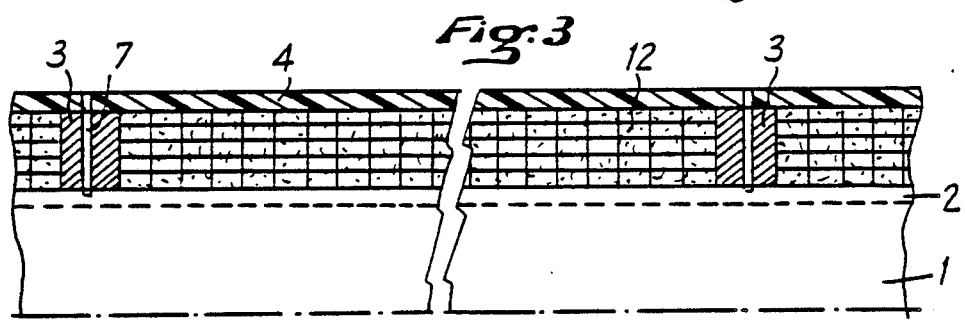
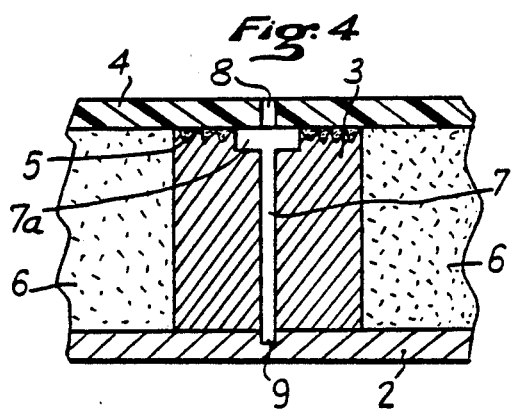
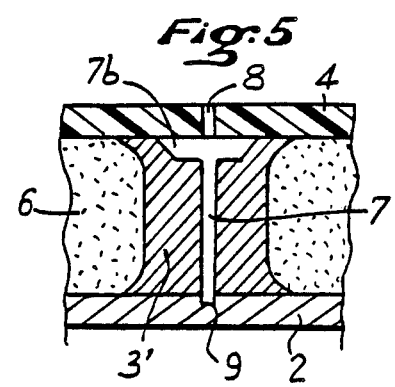

HEAT INSULATED LINE FOR THE TRANSPORT OF FLUIDS

The present invention relates to a heat insulated line or conduit for the transport of fluids, usable in particular but not exclusively for transporting hydrocarbon products from undersea wells.

The problem of thermal insulation of undersea production conduits arises in particular in the exploitation of deposits of heavy oils which risk congealing during their transport between the well and the platform, due to heat losses in the line surrounded by sea water, thermal insulation also being necessary to prevent the formation of hydrates, which certain crude oils are subject to do during chilling.

It has already been proposed to make thermal insulated conduits comprising an essentially central pipe or core, whose outer wall is surrounded concentrically by an also rigid tubular casing, and in which insulation material, such as a polyurethane foam, is injected in the annular space around the outer surface of the core. This injection of foam can be carried out either on land or on a barge or ship. It is established in practice that such foam injections are difficult to perform on board ship before the line is installed or laid and, when injections are carried out on land, significant problems arise concerning the handling of the resulting rigid line. Another disadvantage of the lines made up to the present, is their low resistance to crushing, generally now exceeding 5 bars, which is insufficient to resist outside pressures and in particular the hydrostatic pressure which under modern conditions of exploitation can be greater than 20 bars.

The present invention proposes to provide a thermally insulated line comprising around a preferably flexible pipe or core a thermal insulating structure offering in particular good resistance to outside pressures in particular with respect to crushing, having a low coefficient of thermal conductivity, able to maintain its physical properties in the presence of sea water and having very low water absorption, even under pressure and at relatively high temperature, especially on the order of 60 degrees to 100 degrees Centigrade.

In the present application, the term "flexible" is intended to designate any structure, even a rigid one, able to be wound without damage on small reels or drums whose diameter does not exceed 10 m.

The invention is more particularly applicable with flexible pipes or cores comprising an inner sealed casing, reinforcing sheathing and an outer protective casing. These pipes can also comprise a metal carcass for resistance to crushing. Such pipes are made and sold in long lengths and in different diameters by Societe Coflexip.

The line or conduit according to the invention is essentially characterized by the fact that it comprises, around the inner pipe or core, a plurality of annular walls or partititions spaced along the length of the core and fixed thereto, an insulation material filling the annular chambers provided between the front faces of successive partitions and the outer covering of the inner core, and a continuously extruded outer casing concentric to the core and fixed to the peripheral surfaces of the annular partitions and the insulation material.

In one particular embodiment, the partitions are separate from each other and are preferably made individually, particularly by molding, directly on the core, from an appropriate material, particularly modified polyurethane, and are spaced apart along the length of the core at intervals of from 20 to 200 m, as a function of the conditions of service.

These partitions have a radial length beginning from their inner diameter of between 20 and 100 mm, and a thickness of between 100 and 250 mm.

In a second embodiment, the annular walls or partitions are interconnected by a tubular core from which they extend, the tubular core coaxially surrounding the inner core.

In the two embodiments, the outer peripheral surfaces of the partitions can comprise means, such as grooves and/or projections for improving the application and retention of an adhesive product for joining the outer casing extruded around the core provided with the partitions.

In one preferred embodiment of the invention, each of the partitions comprises at least one internal radial passage providing communication between the outer cover of the inner core of the line, and the outside of the line by opening into a corresponding orifice provided in the outer casing of the line. For this purpose, a peripheral groove forming a reduction in the thickness of the cover is provided in this latter, forming a zone of preferential rupture in case of excess gas pressure.

This embodiment is suitable in the case of a core subject to diffusions of gas, the passages ensuring preferential paths for the passage of diffused gas preventing the gas from passing into the thermal insulation material between the partitions.

The insulation material can be applied or installed in any appropriate manner. In particular, it is possible in one embodiment of the invention to inject a foam, particularly polyurethane, between the annular partitions previously installed on the core, or inside a hollow body in the form of a portion of a shell having an inner diameter equal of the outer diameter of the core, plus several mm, corresponding to the thickness of a strip needed to fill the resulting clearance between the cores and the shell. This strip can be made for example of foam rubber, cellular PVC or another material.

However, in one useful embodiment of the invention, the insulation material is installed by spiralling, around the core, a shaped piece in the form of a band or tube which is wound along a predetermined path and in an appropriate number of layers corresponding to the diameter of the annular partitions.

It is possible according to the invention to combine, should the occasion arise, the methods of applying the insulation material, this latter, then being in part applied by injection, in part by spiralling, or it can be applied in a shell and in part by spiralling.

In a first example of execution of spiralling a band can be used, for example of PVC, PVCC, PC, expanded obtained either by extrusion, or joining or splicing strips cut from a cast or molded slab; or an extruded shaped part for example of PP, PPO, PVCC, which is applied on the inner core by deformation. Such shaped parts in the form of strips of bands are given, for example, a width on the order of 0.5 to 10 cm and a thickness on the order of 5 to 30 mm, the value of the plastic deformation varying from 2 to 10% according to the thickness of the shaped part and the diameter of the core. Such shaped parts having a high resistance to stretching allowing them to be spiralled by a winding machine, starting from reels or coils on which the shaped parts are stored in very long lengths. The joining or splicing is done by gluing.

In a secnd method of execution of the invention, there can be spiralled in large pitches tubes for example of PPO, PVCC, PE of diameters which can vary from 5 to 30 mm and thicknesses of 0.5 to 4 mm. These tubes can be filled with an insulating material for example of small balls of polystyrene to limit the phenomenon of convection.

In the two methods of execution, the spiralling is carried out with a certain play or clearance which gives the conduit structure a great flexibility, compatible, should the occasion arise, with that of the inner conduit or core.

It is also possible to place between the annular partitions, disks or shells obtained notably by molding of expanded polymer products.

As a variant, there can be placed around the inner core a plurality of shells between which the partitions are made, especially by injection, the material of the partitions being able, if the need arises, to completely surround the shells.

Thus according to the invention it is possible to make especially flexible heat insulated conduits of great lengths.

Other advantages and characteristics of the invention will appear in the following description of particular embodiments given as non-limiting examples and with reference to the attached drawings on which:

FIG. 1 is a very fragmentary schematic view of a section of line or conduit according to a first embodiment, FIG. 2 is a fragmentary schematic view of a section of line or conduit according to a second embodiment, FIG. 3 is also a fragmentary and schematic view of a line or conduit according to another embodiment, FIGS. 4 and 5 are enlarged views showing variations of the annular partitions positioned in the conduits according to the invention, and FIGS. 6 to 9 show different phases of mixing a conduit according to the invention.

Reference will first be made to FIG. 1.

The line or conduit shown on this fig. comprises an inner pipe or core 1 provided with an outer protective covering 2 made of a flexible material such as a polyamide or polyethylene.

Around the core 1 there are placed on the outer covering 2 of the core, a plurality of annular walls or partitions 3 in the form of disks. These partitions 3 in the form of disks are in one particular embodiment, of polyurethane of a Shore A hardness of between 70 and 90, and are placed on the core with predetermined spacing, for example, on the order of 2 meters in the present example.

The line or conduit according to the invention comprises an outer casing 4 continuously extruded and secured to or joined with the peripheral surfaces of the partitions 3. As can be seen at FIG. 4, the peripheral surface of the partitions 3, in the form of disks, has a series of grooves 5 for improving cementing to the casing 4 by means of an adhesive such as a heat meltable glue applied on the periphery of the partiton 3 before application of the casing, or injected through the casing 4 as will be described in greater detail below.

In the annular spaces provided between the outer face of the covering 2, the outer casing 4 and the different partitions 3, is placed, according to the invention, an insulation material 6. In the embodiment of FIG. 1, the insulation material 6 can be a polyurethane foam molded by injection on the core 1 after installing the partitions 3, the casing 4 also being secured to the periphery of the insulation material 6.

In the embodiment of FIG. 1, there are provided in partitions 3 radial passages 7 opening into orifices 8 of the outer casing 4, and on either side of a peripheral groove 9 provided in the outer cover 2 of the core. These passages 7 have as their basic function to ensure preferential paths for the passage or venting of gas contained in the line, preventing this gas, in case of excess pressure, from diffusing through the insulation material 6.

It must be understood that these passages 7 are only an optional characteristic and that according to the invention it is contemplated to provide annular partitions, whether or not they are provided with such passages.

In the embodiment of FIG. 2, the line or conduit comprises, around the core 1, a central tube 10 with outwardly extending annular partitions 11 on the peripheral face of which is fastened the outer casing 4.

This peripheral face of partitions 11 is, again, advantageously provided with grooves 5 to improve the adhering.

An insulation material 6 is there again used to fill the annular spaces between the tubular tube 10, the partitions 11 and the casing 4. Although it is not shown on the drawings, it is also possible to provide, in this embodiment, passages in the partitions to ensure protection against excess gas pressures.

The embodiment according to FIG. 3 is distinguished from the embodiment according to FIG. 1, essentially by the fact that the insulation material designated by 12 is put in place by spiralling of bands or of shaped parts such as those described above, wound on the core by plastic deformation or a cellular shaped part of non-expanded polypropylene wound by elastic deformation.

Such shaped parts, presently known, have a crush deformation of 10%, at on the order of 40 to 100 bars, a low thermal conductivity, a density generally between 0.25 and 0.6 grams per cm$^3$, good resistance to creeping, and very low or non-existent absorption of water.

The manufacture of a line or conduit according to FIG. 3 will be described in greater detail below with reference to FIGS. 6 to 9.

In the conduit according to FIG. 3, the annular partitions 3 can be spaced at relatively large intervals, for example, on the order of 20 meters.

There again it is possible to use partitions, whether or not they are provided with passages for the venting of gas. In the same way it is possible to envision an embodiment using insulation material spiralled as in FIG. 3 with partitions like those shown at FIG. 2 and extending from a central tubular core. It is also possible to envisage a combination of the two types of insulation material, the spaces between the partitioning being able to be filled in part with molded insluation material and in part with spiralled insulation material, or again with spiralled insulation materials with different pitches.

FIGS. 4 and 5 illustrate two variations for assembling or installing the partitions, according to the invention. The partition 3 shown on FIG. 4 has the form of a disk with parallel sides and the passage 7 opens, in the region of the periphery of the partition, into a cavity 7a aligned with the orifice 8 in the outer casing 4. This arrangement can be used for the injection of an adhesive or cement to improve the anchoring or fastening of the outer casing 4 on the partition 3.

In the embodiment of FIG. 5, the partition 3 has the form of a column whose anchoring supports on cover 2 of the inner core and/or on the casing 4 can also be provided with grooves as in the embodiment of FIG. 4. A cavity 7b is also provided at the end of the conduit or passage 7 for the injection of a gluing material.

One preferred process for manufacturing a conduit according to the invention will now be described with reference to FIGS. 6 to 9.

As shown at FIG. 6, there is first installed by spiralling around the outer cover 2 of core 1 the insulation material 12, over the entire length of the core. In one particular example of an embodiment, for a core with a diameter of 240 mm, insulation with a thickness of 40 mm is formed.

Figure 7:
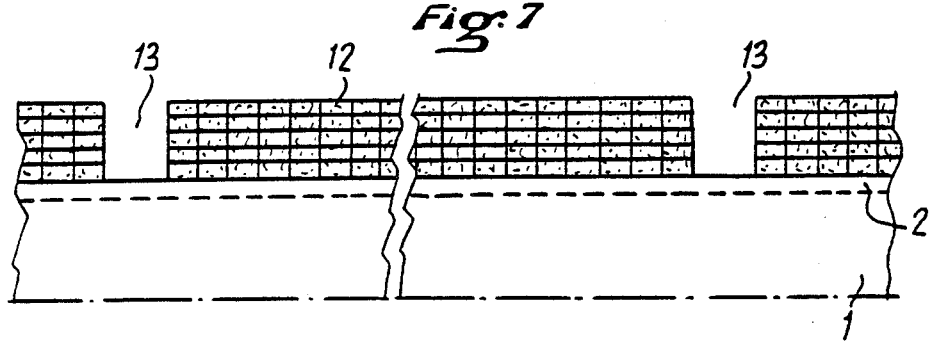
Figure 8:
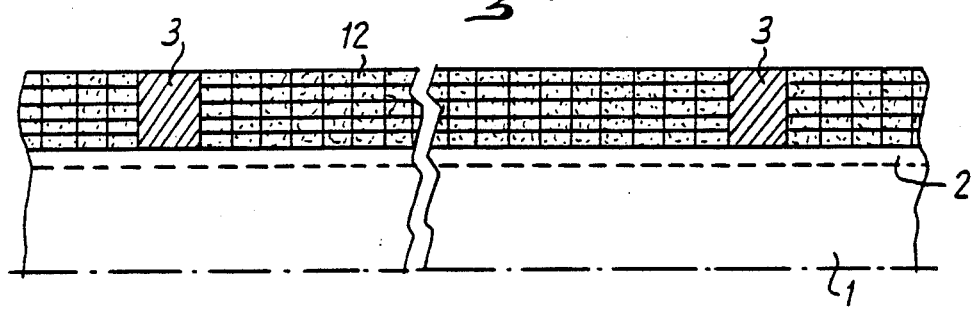
Figure 9:
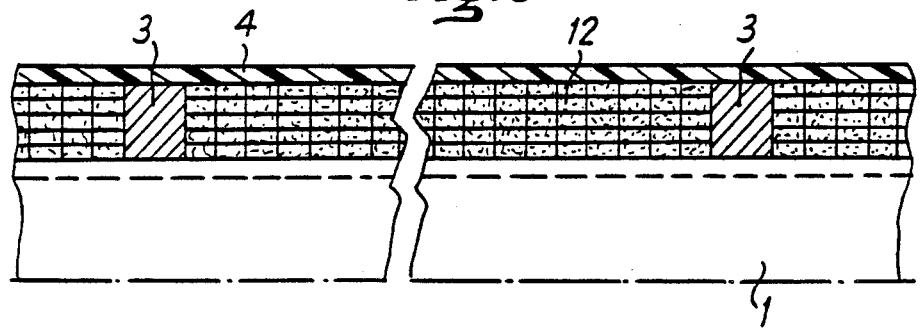

The next step consists, as shown on FIG. 7, of cutting out at appropriate intervals, rings 13 of the insulation 12.

In the example of this embodiment, rings are cut out which have a thickness of 150 mm, and are spaced every 100 meters.

The cut walls of insulation 12 are then sealed at the level of the rings 13 by means of an appropriate mastic.

If the occasion arises in which the partition to be installed must have a passage for gas removal, there is made at the base of each ring 13 a groove in the cover 2 of the core.

By means of an appropriate solvent, the outer surface of the cover 2 of the core is cleaned and an appropriate primer is applied to this surface. Then the annular partitions 3 are molded. After the molding of each partition, with is done by positioning an appropriate mold, the outer surface of the assembly consisting of the core provided with the insulation and the partitions is cleaned with an appropriate solvent, essentially to remove the mold stripping agent. Next a thermo-melt cement is applied on the periphery of the assembly and an outer casing, preferably of polyamide or polyethylene, is extruded at a high temperature, on the order of 180 degrees C, fusing the thermo-melt cement and ensuring the adherence of the casing to the partitions.

Although the invention has been described in connection with particular embodiments, it is of course evident that it is in no way thereby limited and can undergo numerous variations and modifications without exceeding either its scope or its spirit.

We claim:

1. A thermally insulated conduit for the transfer of fluids, comprising an inner central pipe through which fluids can flow, a cover covering said pipe, a plurality of annular partitions spaced apart along the length of said pipe and sealed to said cover of the pipe, each partition having an outer peripheral surface and side faces, insulating material filling the annular chambers defined between side faces of successive partitions and the outer surface of said cover of the pipe, said insulating material having a peripheral surface, and an outer continuous extruded casing concentric to said pipe and joined with the peripheral surface of said insulating material, said outer casing being sealed to the peripheral surfaces of said annular partitions, so that said partitions define sealed chambers between said cover of the pipe and said outer casing, where the annular partitions are interconnected by a tube, said partitions extend radially from said tube, and said tube coaxially surrounds said inner pipe.

2. A thermally insulated conduit for the transfer of fluids comprising, an inner central pipe through which fluids can flow, a cover covering said pipe, a plurality of annular partitions spaced apart along the length of said pipe and joined thereto, each partition having an outer peripheral surface and side faces, insulating material filling the annular chambers defined between side faces of successive partitions and the outer surface of said cover of the pipe, said insulating material having a peripheral surface, and an outer continuous extruded casing concentric to said pipe and joined with the peripheral surfaces of said annular partitions and the peripheral surface of said insulating material, and wherein, the partitions comprise at least one inner radial passage providing communication between the outer cover of the inner pipe of the conduit and the outside of the conduit, said passage opening into a corresponding opening provided in the outer casing.

3. A thermally insulated conduit according to claim 2 wherein, the outer cover of the inner pipe has a peripheral groove facing said passage.

4. A thermally insulated conduit for the transfer of fluids comprising, an inner central pipe through which fluids can flow, a cover covering said pipe, a plurality of annular partitions spaced apart along the length of said pipe and joined thereto, each partition having an outer peripheral surface and side faces, insulating material filling the annular chambers defined between side faces of successive partitions and the outer surface of said cover of the pipe, said insulating material having a peripheral surface, and an outer continuous extruded casing concentric to said pipe and joined with the peripheral surfaces of said annular partitions and the peripheral surface of said insulating material, and wherein, the annular partitions are interconnected by a tube, said partitions extend radially from said tube and are integral therewith, and said tube coaxially surrounds said inner pipe, said outer casing being sealed to the peripheral surfaces of said annular partitions, so that said partitions define sealed chambers between said cover of the pipe and said outer casing.

* * * * *